(12) United States Patent
Kim

(10) Patent No.: US 10,337,364 B2
(45) Date of Patent: Jul. 2, 2019

(54) ONE-WAY CLUTCH TYPE VARIABLE VALVE TIMING DEVICE AND ENGINE SYSTEM HAVING THE SAME

(71) Applicants: Hyundai Motor Company, Seoul (KR); Kia Motors Corporation, Seoul (KR)

(72) Inventor: Won-Gyu Kim, Seoul (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 0 days.

(21) Appl. No.: 15/853,145

(22) Filed: Dec. 22, 2017

(65) Prior Publication Data

US 2019/0003346 A1     Jan. 3, 2019

(30) Foreign Application Priority Data

Jun. 29, 2017  (KR) .................. 10-2017-0082574

(51) Int. Cl.
*F01L 1/34*      (2006.01)
*F01L 1/344*     (2006.01)
(Continued)

(52) U.S. Cl.
CPC .............. *F01L 1/3442* (2013.01); *F01L 1/047* (2013.01); *F16D 41/066* (2013.01); *F01L 2001/0475* (2013.01); *F01L 2001/34426* (2013.01); *F01L 2001/34483* (2013.01); *F01L 2201/00* (2013.01); *F01L 2250/02* (2013.01); *F16D 2041/0665* (2013.01); *F16D 2300/06* (2013.01)

(58) Field of Classification Search
CPC . F01L 1/3442; F01L 1/047; F01L 2001/0475; F01L 2001/34426; F01L 2001/34483; F01L 2201/00; F01L 2250/02; F16D 41/066; F16D 2041/0665; F16D 2300/06
See application file for complete search history.

(56) References Cited

U.S. PATENT DOCUMENTS 5,078,647 A     1/1992  Hampton
5,870,983 A *   2/1999  Sato ................... F01L 1/34406
                                            123/90.17

(Continued)

FOREIGN PATENT DOCUMENTS

EP       0 536 237 B1    12/1994
JP       H 0610966 A      1/1994
JP       2002-256827 A    9/2002

*Primary Examiner* — Zelalem Eshete
(74) *Attorney, Agent, or Firm* — Morgan, Lewis & Bockius LLP

(57) ABSTRACT

A variable valve timing device applied to an engine system may include a rotor supplied with oil and rotated in clockwise and counterclockwise directions, one-way clutches coupled to the rotor to limit an amount of rotation of the rotor, a sprocket having a rotor hole surrounding an external diameter portion of the rotor, a rotation shaft fitted into a shaft hole of the rotor for the supply of oil to oil grooves, and a shaft fixing member coupled to the rotation shaft to fix the rotor and the rotation shaft, wherein the one-way clutches restrict clockwise/counterclockwise rotation of the rotor by torque of a camshaft, achieving an improvement in fuel efficiency/emission material (EM) of an engine.

18 Claims, 11 Drawing Sheets

(51) Int. Cl.
*F01L 1/047* (2006.01)
*F16D 41/066* (2006.01)

(56) References Cited

U.S. PATENT DOCUMENTS

| | | | |
|---|---|---|---|
| 6,591,800 B1 | 7/2003 | Methley | |
| 2012/0152188 A1* | 6/2012 | Weber | F01L 1/3442 123/90.15 |
| 2013/0068183 A1* | 3/2013 | Takada | F01L 1/3442 123/90.17 |

\* cited by examiner

ONE-WAY CLUTCH TYPE VARIABLE VALVE TIMING DEVICE AND ENGINE SYSTEM HAVING THE SAME

CROSS-REFERENCE(S) TO RELATED APPLICATIONS

The present application claims priority to Korean Patent Application No. 10-2017-0082574, filed on Jun. 29, 2017, the entire contents of which is incorporated herein for all purposes by this reference.

BACKGROUND OF THE INVENTION

Field of the Invention

The present invention relates to a variable valve timing device; and, more particularly, to an engine system having a variable valve timing device in which a one-way clutch is applied to a rotor connected to a camshaft.

Description of Related Art

In general, a variable valve timing device controls a phase of a camshaft that opens and closes intake and exhaust valves. In the present case, the variable valve timing device is a continuously variable valve timing (hereinafter, referred to as "CVVT") device that directly controls a camshaft to adjust an advanced/retarded phase timings of a cam, and may include a continuously variable valve duration (CVVD) in which valve duration is controlled without a change in valve lift, and a continuously variable valve lift (CVVL) in which valve duration is controlled by changing valve lift.

To the present end, the CVVT device is configured to directly connect a rotor, which rotates in clockwise/counterclockwise directions by torque generated when a valve is opened and closed along with a rotation of a camshaft, to the camshaft. The CVVT is classified as a hydraulic CVVT device and an electric CVVT device according to the method of controlling the rotation of the rotor in the clockwise/counterclockwise directions for controlling the phase of the camshaft.

For example, the hydraulic CVVT device controls the phase of the camshaft by rotating a rotor vane using the pressure of oil supplied to advance/retard grooves formed in a camshaft journal. On the other hand, the electric CVVT device is classified into a friction clutch type CVVT device that controls the phase of the camshaft using a friction clutch, and a motor type CVVT device that controls the phase of the camshaft using an electric motor.

Accordingly, each of the hydraulic CVVT device, the friction clutch type CVVT device, and the motor type CVVT device optimally control the opening or closing timings of intake and exhaust valves according to the revolutions per minute (RPM) of an engine by directly controlling the camshaft, achieving an improvement in fuel efficiency of the engine, an reduction in emissions, an increase in low-speed torque, and an improvement in power.

However, the hydraulic CVVT device consumes too much oil and has a limited response due to oil pressure while an intermediate phase is restrictively fixed when the engine is started. The friction clutch type CVVT device deteriorates clutch durability due to the friction clutch and fuel efficiency due to an increase in driving friction of the camshaft. The motor type CVVT device has an advantage in that it has a rapid response and an intermediate phase is fixable when the engine is started by the electric motor, but has a disadvantage in that it has a complicated structure/control and is expensive to produce and/or maintain.

The information included in this Background of the Invention section is only for enhancement of understanding of the general Background of the Invention and may not be taken as an acknowledgement or any form of suggestion that this information forms the prior art already known to a person skilled in the art.

BRIEF SUMMARY

Various aspects and exemplary embodiments of the present invention are directed to providing a one-way clutch type variable valve timing device configured for restricting clockwise/counterclockwise rotation of a rotor by torque of a camshaft acting as a rotation shaft using a one-way clutch, achieving an improvement in fuel efficiency/emission material (EM) of an engine in addition to improving a phase setting degree of freedom and expanding a phase shift with respect to the camshaft when the engine is started, and realizing a rapid response and intermediate phase starting and increasing a phase range with low cost, and an engine system having the same.

Other various aspects of the present invention can be understood by the following description, and become apparent with reference to the exemplary embodiments of the present invention. Also, it is obvious to those skilled in the art to which the present invention pertains that the objects and advantages of the present invention can be realized by the means as claimed and combinations thereof.

In accordance with various exemplary embodiments of the present invention, a variable valve timing device may include a rotor rotated in clockwise and counterclockwise directions together with a supply of oil thereto, a one-way clutch coupled to the rotor to limit an amount of rotation of the rotor, a sprocket having a rotor hole surrounding an external diameter portion of the rotor, a rotation shaft fitted into a shaft hole of the rotor for the supply of oil to an oil groove, and a shaft fixing member coupled to the rotation shaft to fix the rotor and the rotation shaft.

The one-way clutch may include a carrier, a position of which is controlled by hydraulic action to form left and right chambers filled with the oil, a ball disposed in a ball slot of the carrier, a stopper carrier protruding from the carrier to limit the amount of rotation of the rotor, and a spring supported by a vane. The rotor may have a rotor body having a shaft hole formed in a center thereof, the carrier may surround an external diameter portion of the rotor body, the ball may come into contact with an external peripheral surface of the rotor body, and the vane may be fixed on the external peripheral surface of the rotor body.

The rotor body may have a hexagonal shape and have an oil outlet hole radially formed therein, the hexagonal rotor body may have upper and lower sealing surfaces formed to seal the center thereof and left and right clutch acting surfaces, the ball coming into contact with the left and right clutch acting surfaces, and a fixed slit may be recessed on one of the upper and lower sealing surfaces, the vane being fixed into the fixed slit. The oil may be discharged from an internal diameter portion of the rotor body to the external diameter portion thereof through the oil outlet hole.

The rotor body may have a rotor flange formed at an intermediate portion thereof, and the one-way clutch may include a front one-way clutch provided at a left side of the rotor flange and a rear one-way clutch provided at a right side of the rotor flange. Alternatively, the rotor body may have left and right rotor flanges formed at both end portions thereof, and the one-way clutch may include front and rear one-way clutches facing each other between the left and right rotor flanges.

In accordance with various exemplary embodiments of the present invention, an engine system may include a variable valve timing device including a rotor, an internal diameter portion of which is coupled with a camshaft, which has a cam for opening or closing intake and exhaust valves and advance and retard oil grooves formed for the supply of oil and which is connected to a crankshaft by a chain, while a sprocket is coupled to an external diameter portion of the rotor, and a pair of front and rear one-way clutches coupled to the rotor form left and right chambers filled with the oil, a hydraulic circuit configured to supply the oil to the camshaft, and an electronic control unit (ECU) configured to control the hydraulic circuit for the supply of oil.

The rotor may have a hexagonal rotor body, and the hexagonal rotor body may have upper and lower sealing surfaces formed to seal the center thereof and left and right clutch acting surfaces acting on the respective front and rear one-way clutches.

The front one-way clutch may include a carrier surrounding one portion of the rotor body to form left and right chambers filled with the oil while a position of the carrier is controlled by the pressure of the oil, a ball located in a ball slot of the carrier to come into contact with an external peripheral surface of the rotor body, a stopper carrier protruding from the carrier to limit an amount of rotation of the rotor body, the stopper carrier being coupled to a stopper groove of the sprocket, and a spring supported by a vane fixed on the external peripheral surface of the rotor body. The rear one-way clutch may include a carrier surrounding the other portion of the rotor body to form left and right chambers filled with the oil while a position of the carrier is controlled by the pressure of the oil, a ball located in a ball slot of the carrier to come into contact with an external peripheral surface of the rotor body, a stopper carrier protruding from the carrier to limit an amount of rotation of the rotor body, and a spring supported by a vane fixedly fitted into a fixed slit formed on one of the upper and lower sealing surfaces of the rotor body.

The rotor may be fixed by a shaft fixing member fastened to the camshaft in a state in which front and rear covers are coupled to both left and right sides of the rotor.

The rotor may include a rotor body having an oil outlet hole radially formed therein for discharge of the oil, the front and rear one-way clutches being coupled to the rotor body, and a rotor flange forming a concentric circle at an intermediate portion of the rotor body to separate the front and rear one-way clutches from each other. Alternatively, the rotor may include a rotor body having an oil outlet hole radially formed therein for the discharge of oil, the front and rear one-way clutches being coupled to the rotor body, and rotor flanges forming a concentric circle at both end portions of the rotor body to surround the front and rear one-way clutches.

The hydraulic circuit may include an oil pump operated by control of the ECU to pump the oil, an oil line leading from the oil pump to the camshaft wherein the oil is supplied to the rotor through the camshaft, and an oil-flow control valve configured to open or close the oil line by control of the ECU to control supply of the oil.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
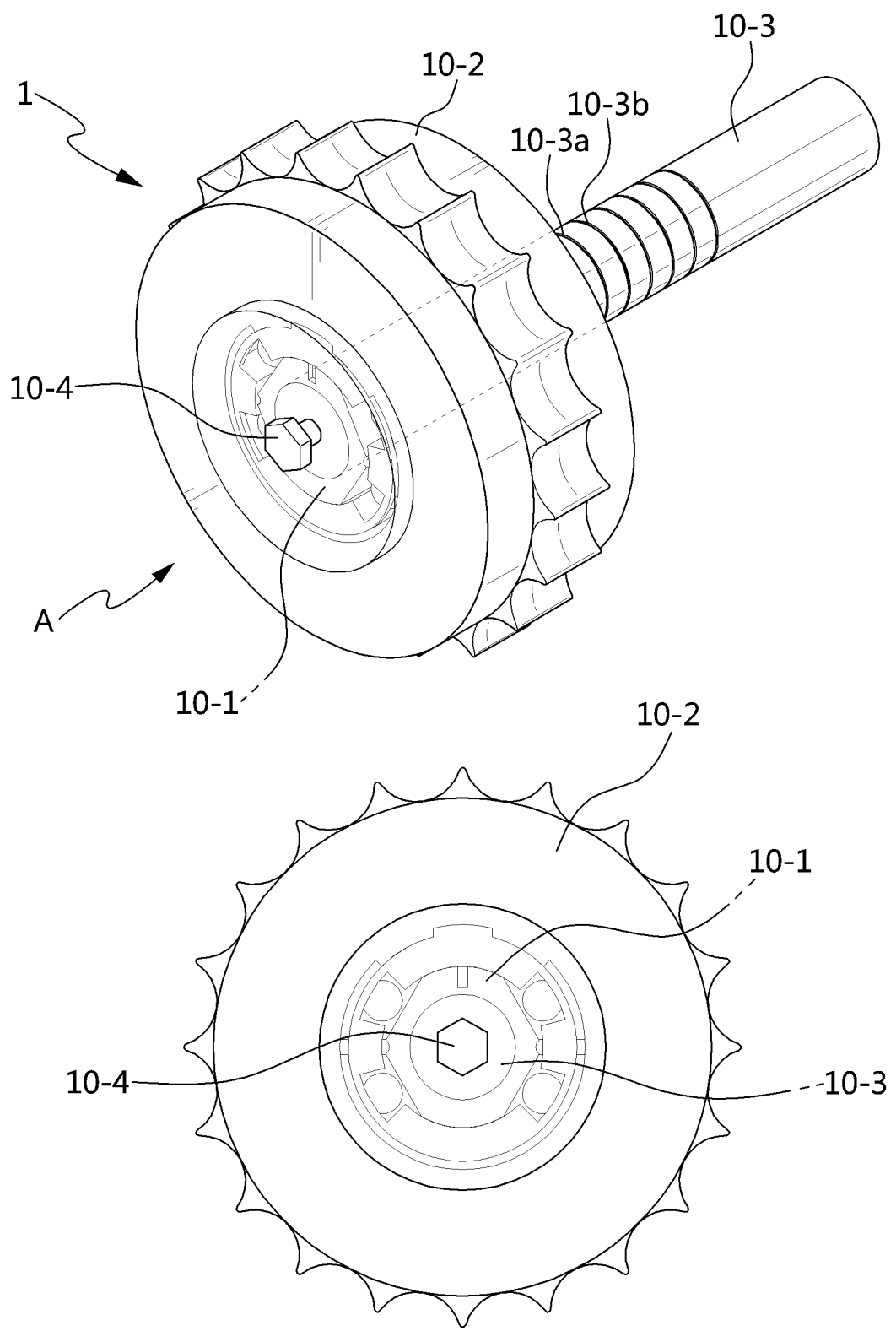
FIG. 1 is an assembled perspective view illustrating a one-way clutch type variable valve timing device according to an exemplary embodiment of the present invention.

It should be understood that the appended drawings are not necessarily to scale, presenting a somewhat simplified representation of various features illustrative of the basic principles of the invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made more specifically to various embodiments of the present invention(s), examples of which are illustrated in the accompanying drawings and described below. While the invention(s) will be described in conjunction with exemplary embodiments, it will be understood that the present description is not intended to limit the invention (s) to those exemplary embodiments. On the other hand, the invention(s) is/are intended to cover not only the exemplary embodiments, but also various alternatives, modifications, equivalents and other embodiments, which may be included within the spirit and scope of the invention as defined by the appended claims.

Referring to FIG. 1, a one-way clutch type variable valve timing device 1 includes a rotor device 10-1 having a one-way clutch, a sprocket 10-2, a rotation shaft 10-3, and a shaft fixing member 10-4.

For example an external diameter portion of the rotor device 10-1 is coupled to the sprocket 10-2 and an internal diameter portion thereof is coupled to the rotation shaft 10-3. The sprocket 10-2 has sprocket teeth, which are formed on an external diameter portion thereof and is chained to an external rotary device, to rotate the rotation shaft 10-3 together with the rotor device 10-1. The rotation shaft 10-3 is coupled to the rotor device 10-1 to rotate along with the rotor device 10-1 when the sprocket 10-2 rotates, and supplies an oil pressure from an external source to internal components of the rotor device 10-1. The shaft fixing member 10-4 is fastened to the rotation shaft 10-3 in the rotor device 10-1 fixing the rotor device 10-1 to the rotation shaft 10-3.

Figure 2:
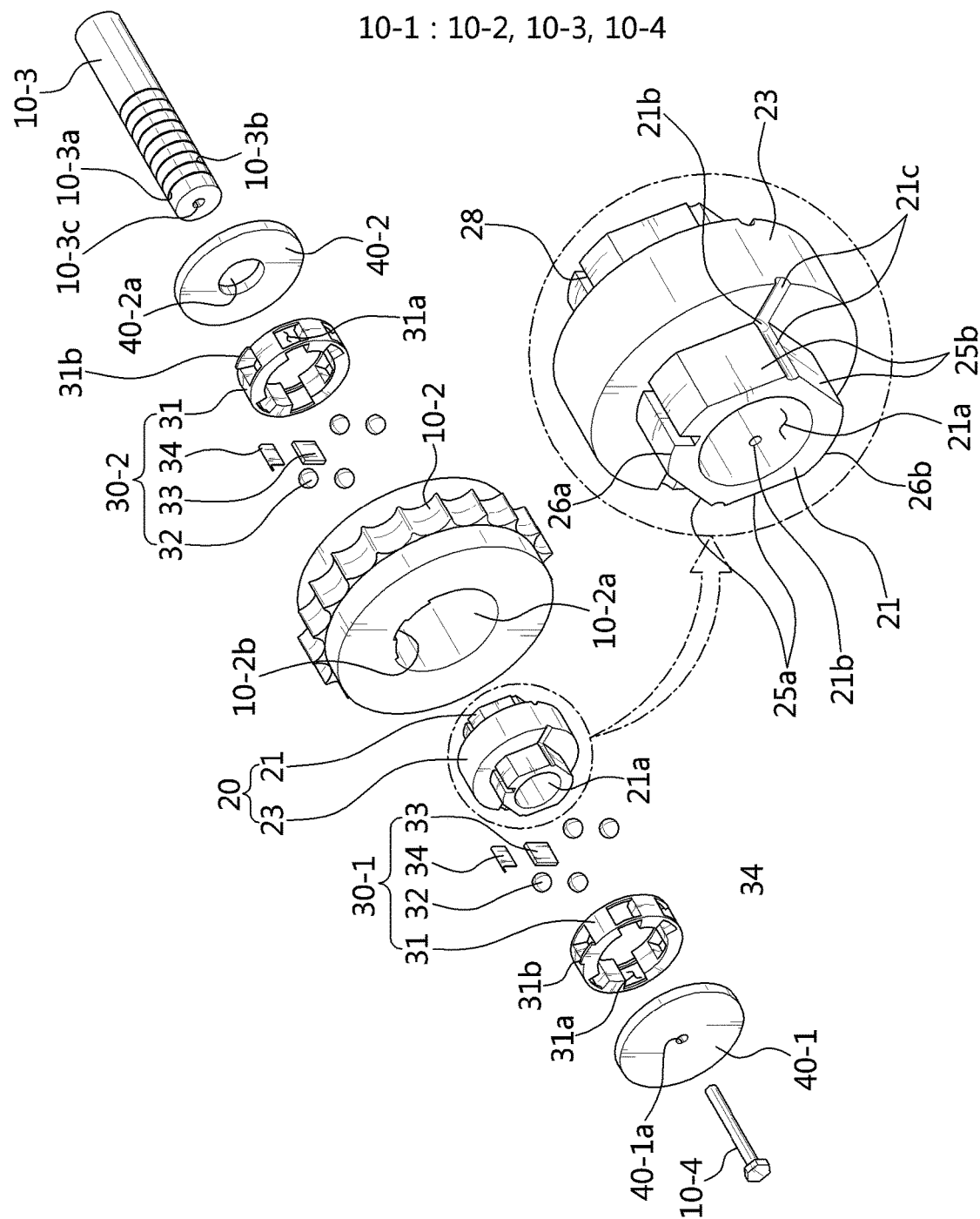
FIG. 2 is an exploded perspective view illustrating the one-way clutch type variable valve timing device according to an exemplary embodiment of the present invention.

FIG. 2 is an exploded perspective view illustrating the one-way clutch type variable valve timing device 1 and illustrates a detailed configuration of the rotor device 10-1 that includes a rotor 20, front and rear one-way clutches 30-1 and 30-2, and front and rear covers 40-1 and 40-2, the sprocket 10-2, the rotation shaft 10-3, and the shaft fixing member 10-4.

In the assembly structure of the rotor device 10-1, the sprocket 10-2, the rotation shaft 10-3, and the shaft fixing member 10-4, which are components of the rotor device 10-1, are configured as follows.

The sprocket 10-2 has the sprocket teeth formed on the external diameter portion thereof and a rotor hole 10-2a formed in a center thereof for fitting of the rotor 20 into the rotor hole 10-2a, and the rotor hole 10-2a has a stopper groove 10-2b which is formed on an internal peripheral surface thereof while having a predetermined angular size. Through such a structure, the sprocket 10-2 restricts rotation of the front and rear one-way clutches 30-1 and 30-2. Especially, the stopper groove 10-2b restricts the movement of stopper carriers 31b formed at the respective front and rear one-way clutches 30-1 and 30-2. As a result, when the rotor 20 rotates by the rotation of the rotation shaft 10-3 (e.g., by the advance/retard rotation of a camshaft), the stopper carriers 31b of the front and rear one-way clutches 30-1 and 30-2 move to positions different from those determined by the stopper groove 10-2b when they move by a predetermined angle or more in a response to hydraulic signals, facilitating additional movement of the rotor 20 to be limited.

The rotation shaft 10-3 has advance and retard oil grooves 10-3a and 10-3b which are recessed from an end portion of an external diameter portion thereof and which are separated by a predetermined interval, and left and right chamber oil lines 10-3a and 10-3bb (see FIG. 4) which are axially formed at an end portion of the internal diameter portion thereof to have a phase difference (e.g., 90 degrees) and which respectively communicate with the advance and retard oil grooves 10-3a and 10-3b. The rotation shaft 10-3 has a bolt groove 10-3c which is axially formed at the end portion thereof, and is fastened to the shaft fixing member 10-4.

The shaft fixing member 10-4 has a typical bolt shape, and is screwed to the bolt groove 10-3c of the rotation shaft 10-3 through a shaft hole 21a of the rotor 20 to fix the rotor 20 and the rotation shaft 10-3.

In the detailed structure of the rotor device 10-1, the rotor 20, the front and rear one-way clutches 30-1 and 30-2 that are respectively coupled to the left and right of the rotor 20, and the front and rear covers 40-1 and 40-2 that, respectively cover the front and rear one-way clutches 30-1 and 30-2 are configured as follows.

The rotor 20 includes a rotor body 21 having the shaft hole 21a formed in a center thereof for fitting of the rotation shaft 10-3 into the shaft hole 21a, and a rotor flange 23 fitted into the rotor hole 10-2a of the sprocket 10-2 to be coupled to the sprocket 10-2. The rotor body 21 and the rotor flange 23 have a difference in diameter and the rotor flange 23 forms a concentric circle with respect to the rotor body 21 in the central section of the rotor body 21 so that the rotor body 21 is divided into a left rotor body and a right rotor body with respect to the rotor flange 23.

Furthermore, the rotor 20 is further formed with an oil outlet hole 21b, an oil slot 21c, left and right clutch acting surfaces 25a and 25b, upper and lower sealing surfaces 26a and 26b, and a fixed slit 28. The oil outlet hole 21b communicates with the oil slot 21c which is radially formed in the rotor body 21 to be recessed from the external diameter portion of the rotor body 21 to both left and right of the rotor flange 23 and which has a "└ " shape. Each of the oil outlet hole 21b and the oil slot 21c is formed at each of left and right portions of the rotor body 21, and have symmetrical structures (e.g., 180 degrees) to the rotor body 21. The left and right clutch acting surfaces 25a and 25b and the upper and lower sealing surfaces 26a and 26b allow the rotor body 21 to have a hexagonal shape.

For example, each of the left and right clutch acting surfaces 25a and 25b is formed of two hexagonal surfaces so that two acute surfaces are planes and have a symmetrical structure in the left and right of the rotor body 21. The two acute surfaces form a rectilinear polygonal structure to implement a one-way clutch function together with the front and rear one-way clutches 30-1 and 30-2. Each of the upper and lower sealing surfaces 26a and 26b is formed of a single hexagonal surface and the hexagonal surfaces of the upper and lower sealing surfaces 26a and 26b have a symmetrical structure in the upper and lower portion of the rotor body 21. They form a curved surface corresponding to the circle to increase a function of sealing oil in an assembled state. The fixed slit 28 is a rectilinear groove which is recessed on the upper sealing surface 26a of the upper and lower sealing surfaces 26a and 26b wherein the upper sealing surface 26a is located above in the assembly state of the rotor 20, and a vane 34 is fixedly fitted into the fixed slit 28, as illustrated in FIG. 3.

The front and rear one-way clutches 30-1 and 30-2 have the same component, namely each of the front and rear one-way clutches 30-1 and 30-2 includes a carrier 31, ball slots 31a, a stopper carrier 31b, balls 32, a spring 33, and the vane 34.

For example, the carrier 31 has an annular flange having a predetermined width and thickness to have four ball slots 31a formed thereon for positioning of the balls 32. The carriers 31 are left and right chambers that are coupled to the rotor body 21 of the rotor 20 to be filled with oil supplied through the advance and retard oil grooves 10-3a and 10-3b, and the positions of the carriers 31 are controlled with oil pressures in the left and right chambers. Furthermore, the carrier 31 has the stopper carrier 31b which protrudes to one end portion of the annular flange by a predetermined size and which moves along the stopper groove 10-2b of the sprocket 10-2, and the movement of the stopper carrier 31b is limited by the stopper groove. As a result, when the rotor 20 rotates by the rotation of the rotation shaft 10-3 (e.g., by the advance/retard rotation of the camshaft), the stopper carriers 31b of the front and rear one-way clutches 30-1 and 30-2 move to positions different from those determined by the stopper groove 10-2b when they move by a predetermined angle or more in a response to hydraulic signals, facilitating additional movement of the rotor 20 to be limited.

The balls 32 are four to be fitted into the four ball slots 31a of the carrier 31, and may be shaped as a roller instead of a sphere. The spring 33 is a bent leaf spring with an elastic force, and is located at a side of the vane 34. The spring 33 is disposed in a region of one of the four ball slots 31a of the carrier 31 to come into contact with the carrier 31 by the rotation of the carrier 31. The vane 34 allows the spring 33 to be located at the side thereof, and is fixedly fitted into the fixed slit 28 of the rotor 20 to be integral with the rotor 20.

Each of the front and rear covers 40-1 and 40-2 has a disk shape. The front cover 40-1 is disposed toward the front one-way clutch 30-1 to cover the front one-way clutch 30-1, whereas the rear cover 40-2 is located toward the rear one-way clutch 30-2 to cover the rear one-way clutch 30-2. To the present end, the front cover 40-1 has a bolt hole 40-1a formed in a center thereof wherein the shaft fixing member 10-4 passes through the bolt hole 40-1a, and the rear cover 40-2 has a shaft hole 40-2a formed in a center thereof wherein the rotation shaft 10-3 passes through the shaft hole 40-2a.

FIG. 3 illustrates a state in which the rotation of the rotor 20 is restricted by the front and rear one-way clutches 30-1 and 30-2. In the present case, clockwise and counterclockwise arrows indicated in FIG. 3 define a rotation state, and the facing arrows define a restriction state.

Figures 3A, 3B:
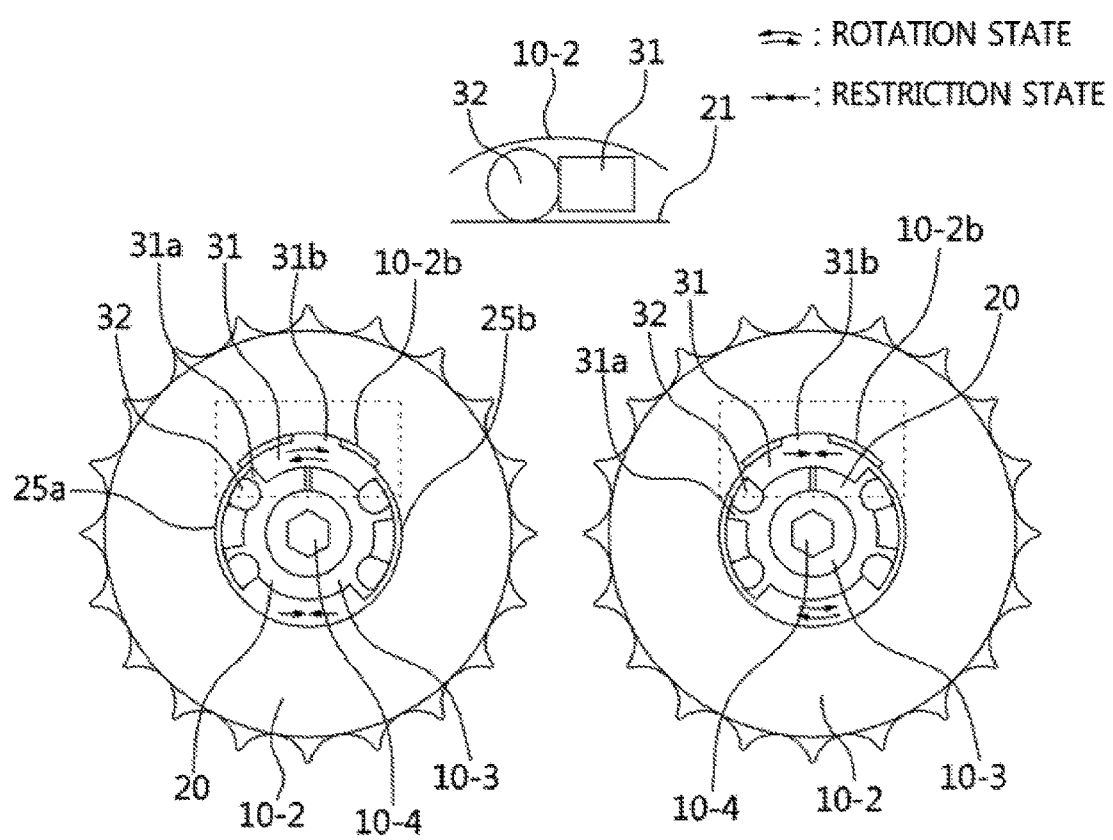
FIG. 3A and FIG. 3B are views illustrating an operating state in which rotation of a rotor is restricted by a one-way clutch according to an exemplary embodiment of the present invention.

In FIG. 3A, the carrier 31 allows the stopper carrier 31b to be located in a center portion of the stopper groove 10-2b at a position relative to the sprocket 10-2, and the ball 32 is in close contact with the left end portion of the ball slot 31a at a position relative to the carrier 31. As a result, since the rotor 20 is restricted in the counterclockwise direction by the carrier 31, the rotor 20 is rotatable only in the clockwise direction thereof. In FIG. 3B, the carrier 31 allows the stopper carrier 31b to be located in the central section of the stopper groove 10-2b at a position relative to the sprocket 10-2, and the ball 32 is in close contact with the right end portion of the ball slot 31a at a position relative to the carrier 31. As a result, since the rotor 20 is restricted in the clockwise direction by the carrier 31, the rotor 20 is rotatable only in the counterclockwise direction thereof. Here, the ball 32 being in close contact with the left end portion of the ball slot 31a signifies that the ball 32 moves in the clockwise direction to move to the right end portion of the ball slot 31a, and the ball 32 being in close contact with the right end portion of the ball slot 31a device that the ball 32 moves in the counterclockwise direction to move to the left end portion of the ball slot 31a. Therefore, the left end portion and the right end portion are defined as positions related to clockwise rotation of the carrier 31.

Figure 4:
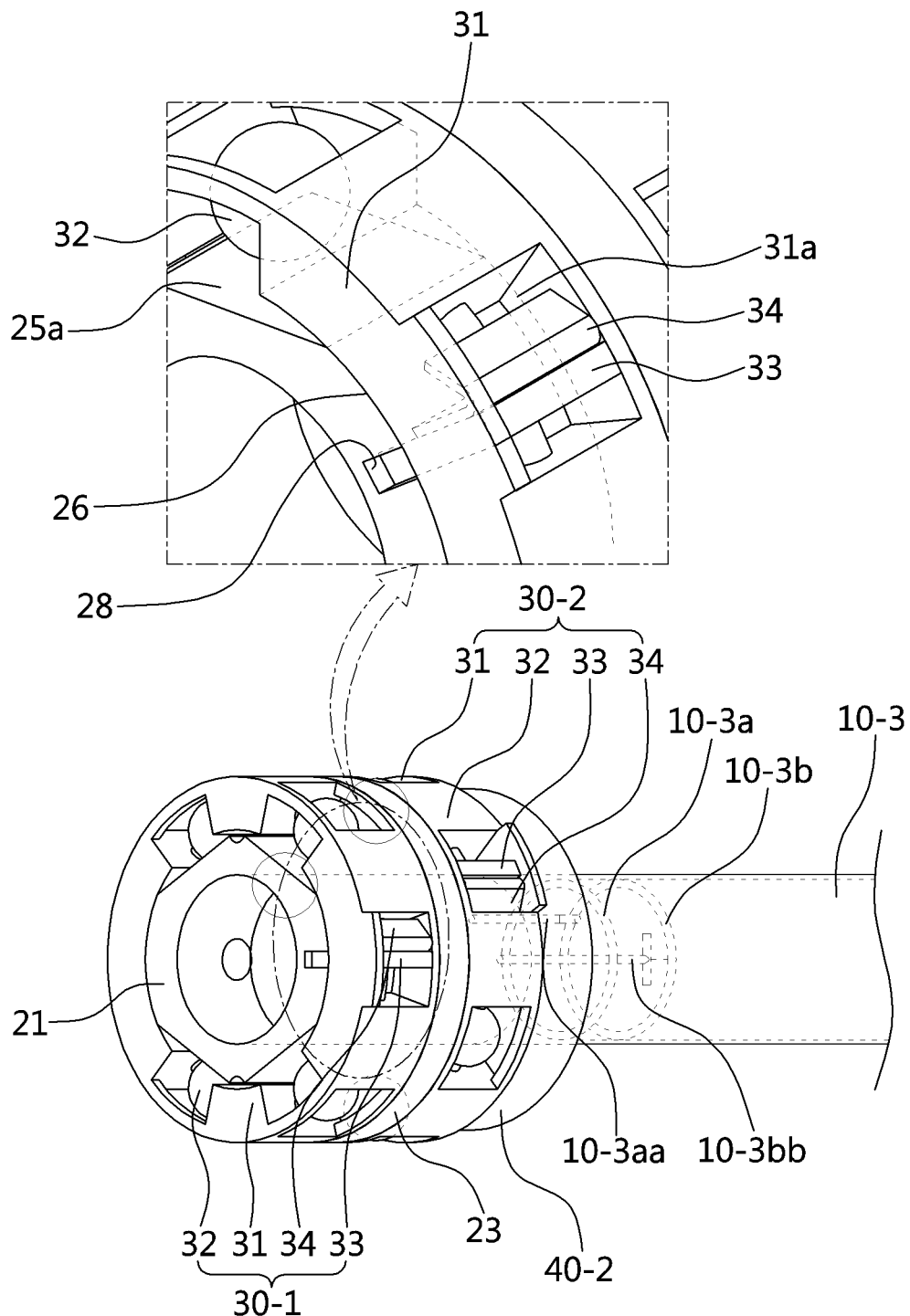
FIG. 4 is a view illustrating an example of a distributed array of one-way clutches according to an exemplary embodiment of the present invention.
Figure 5:
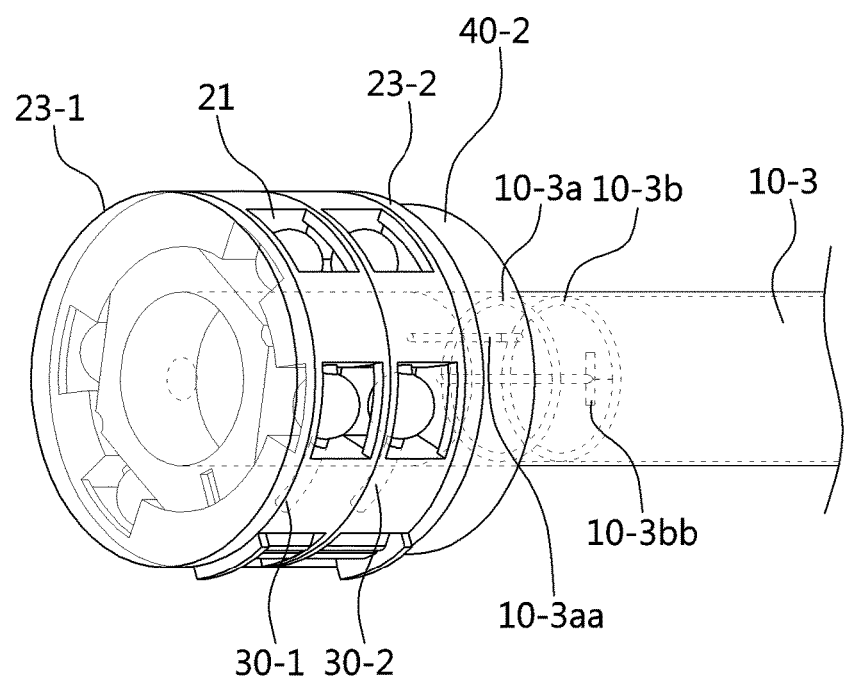
FIG. 5 is a view illustrating an example of a concentrated array of one-way clutches according to an exemplary embodiment of the present invention.

Meanwhile, FIG. 4 and FIG. 5 illustrate the rotor 20 and an array of front and rear one-way clutches 30-1 and 30-2.

FIG. 4 illustrates a distributed array of one-way clutches. In FIG. 4, the front and rear one-way clutches 30-1 and 30-2 are located at the left and right of the rotor 20 with the rotor flange 23 of the rotor 20 interposed therebetween. In the present case, the front one-way clutch 30-1 includes the carrier 31, ball slots 31a, the stopper carrier 31b, balls 32, the spring 33, and the vane 34, and the rear one-way clutch 30-2 includes the carrier 31, ball slots 31a, the stopper carrier 31b, balls 32, the spring 33, and the vane 34. However, when the rotor 20 is divided into left and right portions in section with respect to the fixed slit 28, the front one-way clutch 30-1 differs from the rear one-way clutch 30-2 in that the spring 33 is located at the left of the vane 34 in the front one-way clutch 30-1 whereas the spring 33 is located at the right of the vane 34 in the rear one-way clutch 30-2. The above configuration is because the front and rear one-way clutches 30-1 and 30-2 are operated by introduction of oil.

FIG. 5 illustrates a concentrated array of one-way clutches. In FIG. 5, the front and rear one-way clutches 30-1 and 30-2 are located at the left and right of the rotor 20 between rotor flanges 23 of the rotor 20. Therefore, the front and rear one-way clutches 30-1 and 30-2 are in close contact with each other between the left and right rotor flanges 23, and the front and rear covers 40-1 and 40-2 are coupled to the left and right rotor flanges 23. To the present end, the rotor 20 includes the shaft hole 21a, the oil outlet hole 21b, the oil slot 21c, a rotor body 21, the rotor flange 23, left and right clutch acting surfaces 25a and 25b, upper and lower sealing surfaces 26a and 26b, and the fixed slit 28, as the components thereof. Therefore, the rotor 20 is operated similar to the rotor 20 illustrated in FIG. 1, FIG. 2, FIG. 3, and FIG. 4, but the present rotor 20 differs from the rotor 20 illustrated in FIG. 1, FIG. 2, FIG. 3, and FIG. 4 in that the rotor flanges 23 are located at the left and right end portions of the rotor body 21.

Figure 6:
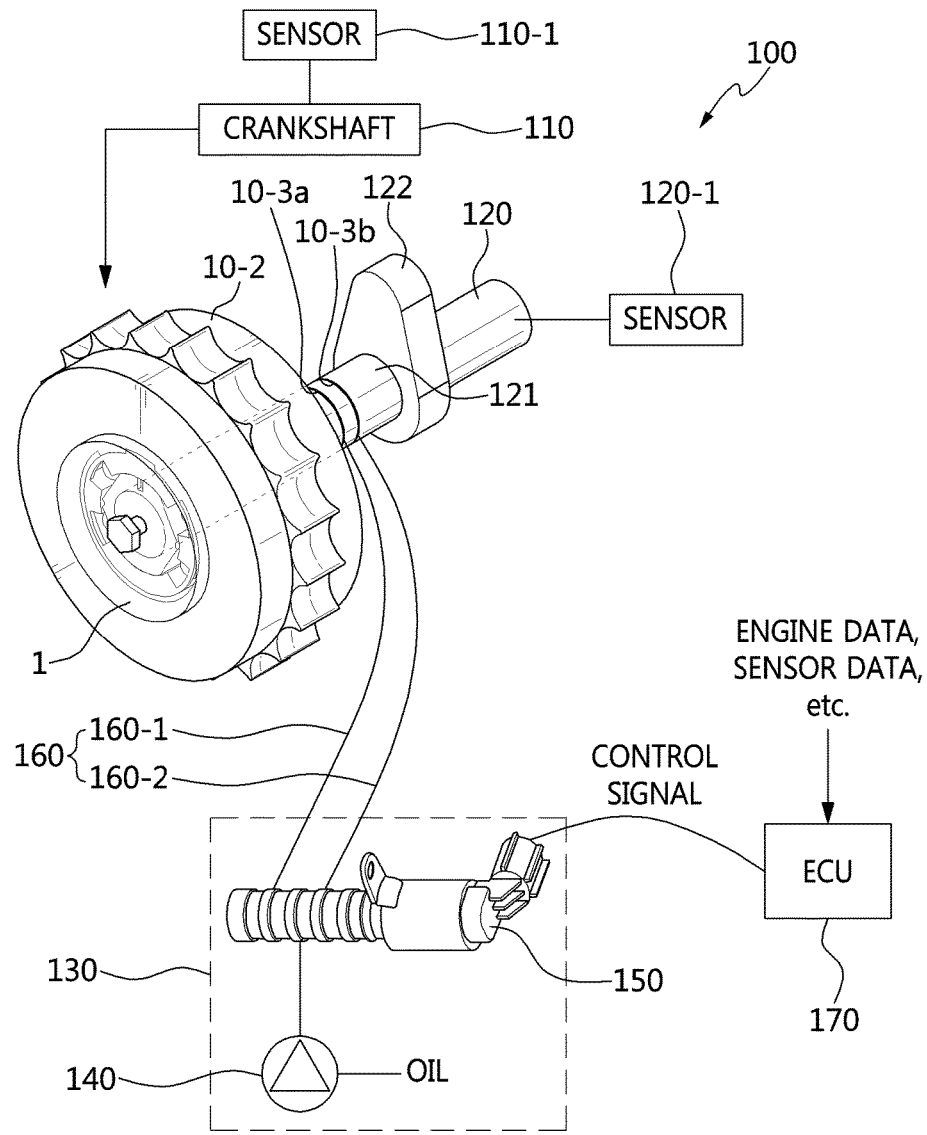
FIG. 6 is a view illustrating an example of an engine system having a one-way clutch type variable valve timing device according to another exemplary embodiment of the present invention.

Referring to FIG. 6, an engine system 100 includes a variable valve timing device 1, crankshaft 110, a crank position detector 110-1, a camshaft 120, a cam position detector 120-1, a hydraulic circuit 130, and an electronic control unit (ECU) 170.

More specifically, the variable valve timing device 1 includes the rotor device 10-1 having front and rear one-way clutches 30-1 and 30-2 and front and rear covers 40-1 and 40-2, the sprocket 10-2, the rotation shaft 10-3, and the shaft fixing member 10-4, as described with reference to FIG. 1, FIG. 2, FIG. 3, FIG. 4, and FIG. 5. However, the sprocket 10-2 is coupled to a timing chain for synchronizing the crankshaft 110 and the camshaft 120 to receive a vertical force by reciprocating motion of a piston, and the provided force is transmitted to the rotor flange 23 of the rotor 20. Therefore, the rotor flange 23 is typically a sliding bearing. The rotation shaft 10-3 is replaced with the camshaft 120. The front and rear one-way clutches 30-1 and 30-2 receive the clockwise/counterclockwise torque of the camshaft 120 by opening or closing of intake and exhaust valves in a state in which the front and rear one-way clutches 30-1 and 30-2 are assembled to the rotor 20. Accordingly, the variable valve timing device 1 restricts the clockwise/counterclockwise rotation of the rotor 20 by the torque using the front and rear one-way clutches 30-1 and 30-2, achieving an improvement in fuel efficiency/emission material (EM) of the engine in addition to improving a phase setting degree of freedom and expanding a phase shift with respect to the camshaft 120 when the engine is started. It is possible to realize rapid response and intermediate phase starting and to increase a phase range.

The variable valve timing device 1 includes continuously variable valve timing (CVVT) that directly controls the camshaft to adjust the advanced/retarded phase timings of a cam, continuously variable valve duration (CVVD) in which valve duration is controlled without a change in valve lift, and continuously variable valve lift (CVVL) in which valve duration is controlled by changing valve lift.

More specifically, the crankshaft 110 is rotated by reciprocating motion of the piston of the engine. The crank position detector 110-1 is configured to detect the speed of the crankshaft 110 to determine the revolutions per minute of the engine. The camshaft 120 is connected to the crankshaft 110 by the timing chain to be synchronized with the crankshaft 110, is coupled to the variable valve timing device 1 by a cam journal 121 forming advance and retard oil grooves 10-3a and 10-3b, and opens and closes the intake and exhaust valves by an eccentric cam 122 according to a combustion timing.

More specifically, the hydraulic circuit 130 supplies oil to the advance and retard oil grooves 10-3a and 10-3b of the camshaft 120. To the present end, the hydraulic circuit 130 includes an oil pump 140, an oil-flow control valve 150, and an oil line 160. For example, the oil pump 140 pumps oil, and the oil-flow control valve 150 opens and closed the oil line 160 to control oil supply for control of advanced and retarded phases of the camshaft 120. The oil line 160 is opened and closed by the oil-flow control valve 150, and is divided into an advance groove line 160-1, through which oil is supplied to the advance oil groove 10-3a of the camshaft 120, and a retard groove line 160-2 through which oil is supplied to the retard oil groove 10-3b of the camshaft 120.

More specifically, the ECU 170 controls a timing by controlling a cam phase by respective detected values of the crank position detector 110-1 and the cam position detector 120-1, and is configured to control operations of the oil pump 140 and the oil-flow control valve 150 by pulse width modulation (PWM) duty as a control signal.

FIG. 7, FIG. 8, FIG. 9, and FIG. 10 illustrate an operating state of the variable valve timing device 1 according to the driving of the engine.

Figure 7:
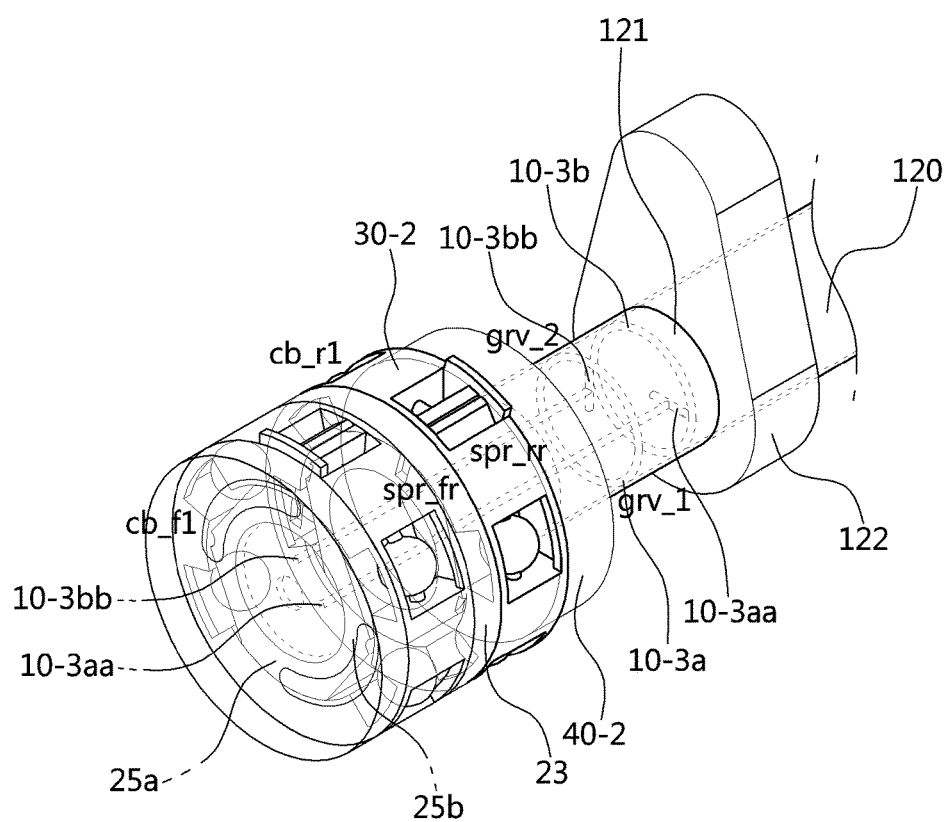
FIG. 7 is a view illustrating a hydraulic connection state of the one-way clutch according to an exemplary embodiment of the present invention.

FIG. 7 is an exemplary embodiment of a distributed array of one-way clutches. In FIG. 7, front and rear one-way clutches 30-1 and 30-2 are coupled to the rotor 20 in a state in which they are separated from each other by the rotor flange 23, and the rotor body 21 of the rotor 20 is coupled to the cam journal 121 to be included in the camshaft 120.

Accordingly, oil is pumped by the oil pump and flows to an advance groove line 160-1 and a retard groove line 160-2 via the oil control valve 150. The oil discharged from the advance groove line 160-1 is supplied to the advance oil groove 10-3a, and the oil discharged from the retard groove line 160-2 is supplied to the retard oil groove 10-3b. Subsequently, the oil discharged from the left chamber oil line 10-3a leading to the advance oil groove 10-3a and the oil discharged from the right chamber oil line 10-3bb leading to the retard oil groove 10-3b are discharged to the oil outlet hole 21b and the oil slot 21c of the rotor 20, and are respectively supplied to the front and rear one-way clutches 30-1 and 30-2. To the present end, the left chamber oil line 10-3a and the right chamber oil line 10-3bb form a phase difference (e.g., approximately 90 degrees). As a result, in a state in which the carriers 31 of the front and rear one-way clutches 30-1 and 30-2 are divided into a left chamber, which is formed at the left with respect to the center of the cam journal 121 and has two balls 32, and a right chamber which is formed at the right with respect to the center of the cam journal 121 and has two balls 32, the chambers are filled with oil.

Furthermore, springs 33 included in the respective front and rear one-way clutches 30-1 and 30-2 form spring forces in opposite directions due to a difference in position with respect to vanes 34. That is, the spring 33 of the front one-way clutch 30-1 applies the spring force to the vane 34 in the clockwise direction thereof, wherein the spring 33 of the rear one-way clutch 30-2 applies the spring force to the vane 34 in the counterclockwise direction thereof. Such a spring force acts as a bias pressure.

Hereinafter, the oil flowing to the advance oil groove 121-1 of the cam journal 121 is defined as grv_1, the oil flowing to the retard oil groove 121-2 of the cam journal 121 is defined as grv_2, the oil-filled left chamber of the carrier 31 of the front one-way clutch 30-1 is defined as cb_f1, the oil-filled right chamber of the carrier 31 of the front one-way clutch 30-1 is defined as cb_f2, the oil-filled left chamber of the carrier 31 of the rear one-way clutch 30-2 is defined as cb_r1, and the oil-filled right chamber of the carrier 31 of the rear one-way clutch 30-2 is defined as cb_r2. Accordingly, the grv_1 flows to the cb_f1 and the cb_r1 through the camshaft 120 and the rotor 20 for transfer of an oil pressure, and the grv_2 flows to the cb_f2 and the cb_r2 through the camshaft 120 and the rotor 20 for transfer of an oil pressure. The spring 33 of the front one-way clutch 30-1 is defined as spr_fr, the spring 33 of the rear one-way clutch 30-2 is defined as spr_rr, and the bias pressure corresponding to the spring force is defined as Pb.

As a result, grv_1 and grv_2 form the following relationship:

$$grv\_2 < grv\_1 - Pb, \qquad \qquad 1)$$

$$grv\_1 - Pb < grv\_2 < grv\_1 + Pb, \text{ and} \qquad 2)$$

$$grv\_1 + Pb < grv\_2. \qquad \qquad 3)$$

Here, the symbol "<" is a sign of inequality indicative of the size between two values, "A<B" signifies that B is a larger value than A, the symbol "−" is a minus sign, and the symbol "+" is a plus sign.

Figure 8:
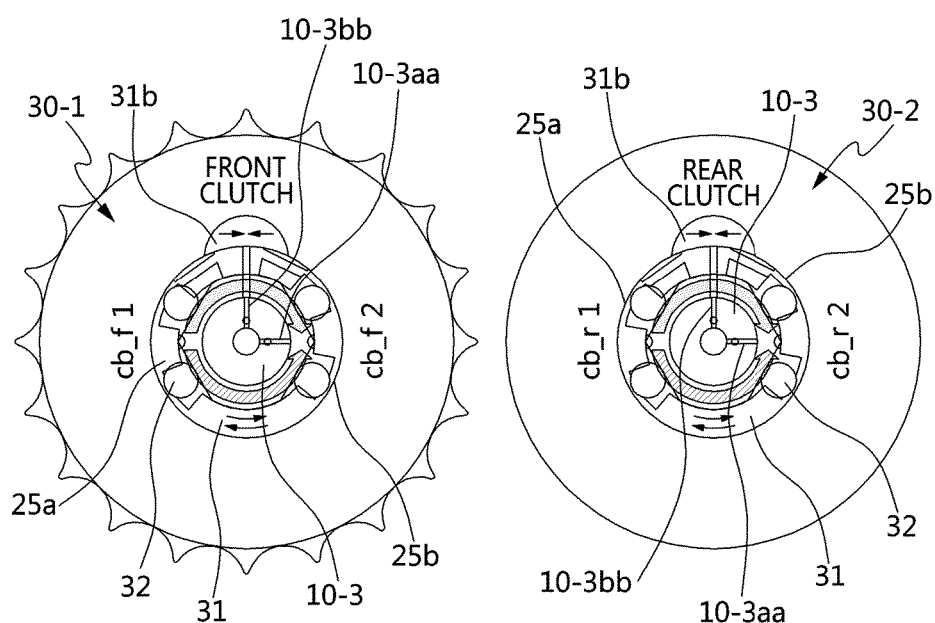
FIG. 8 is a view illustrating an operating state of the one-way clutch, which retards a camshaft by position control of a carrier in a response to hydraulic signals, according to an exemplary embodiment of the present invention.

FIG. 8 is an example of operation of the front and rear one-way clutches 30-1 and 30-2 according to the relationship of 1) "grv_2<grv_1−Pb". The clockwise rotation of the carrier 31 is restricted, generating counterclockwise rotation, in the front one-way clutch 30-1, and at the same time the clockwise rotation of the carrier 31 is restricted, generating counterclockwise rotation, in the rear one-way clutch 30-2. Consequently, the camshaft 120 is retarded by the counterclockwise rotation.

Figure 9:
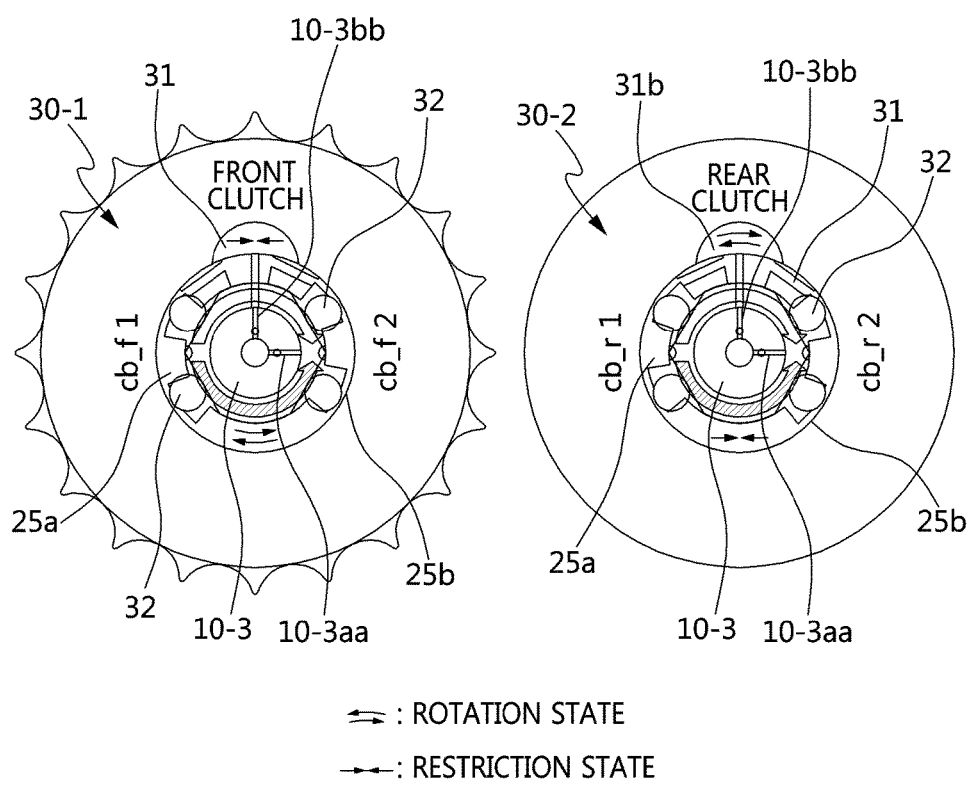
FIG. 9 is a view illustrating an operating state of the one-way clutch, which fixes the camshaft by position control of the carrier in a response to hydraulic signals, according to an exemplary embodiment of the present invention.

FIG. 9 is an example of operation of the front and rear one-way clutches 30-1 and 30-2 according to the relationship of 2) "grv_1−Pb<grv_2<grv_1+Pb". The clockwise rotation of the carrier 31 is restricted, generating counterclockwise rotation, in the front one-way clutch 30-1, and at the same time the counterclockwise rotation of the carrier 31 is restricted, generating clockwise rotation, in the rear one-way clutch 30-2. Consequently, the camshaft 120 is fixed.

Figure 10:
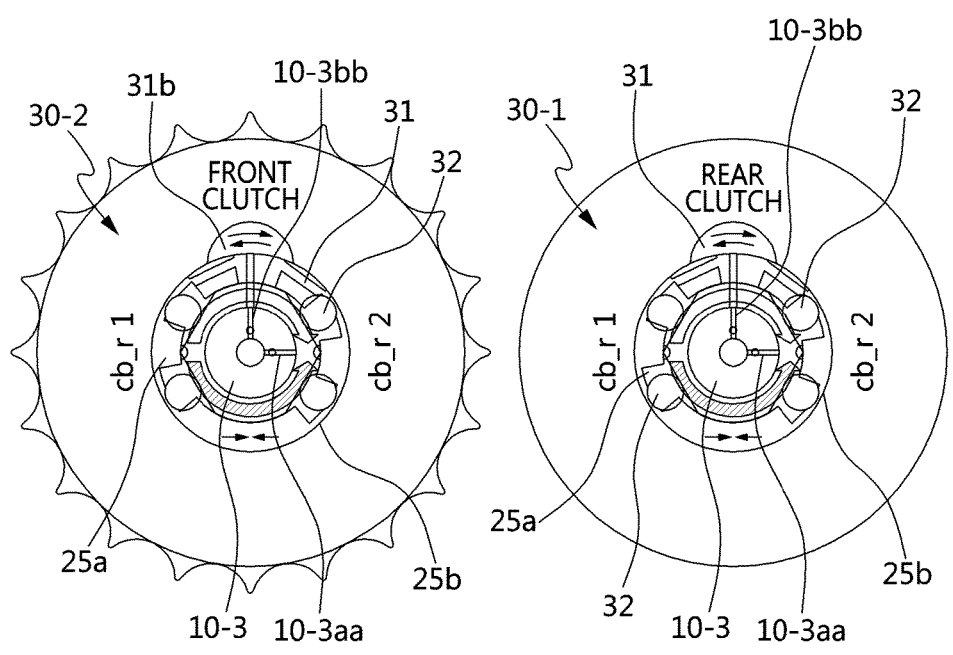
FIG. 10 is a view illustrating an operating state of the one-way clutch, which advances the camshaft by position control of the carrier in a response to hydraulic signals, according to an exemplary embodiment of the present invention.

FIG. 10 is an example of operation of the front and rear one-way clutches 30-1 and 30-2 according to the relationship of 3) "grv_1+Pb<grv_2". The counterclockwise rotation of the carrier 31 is restricted, generating clockwise rotation, in the front one-way clutch 30-1, and at the same time the counterclockwise rotation of the carrier 31 is restricted, generating clockwise rotation, in the rear one-way clutch 30-2. Consequently, the camshaft 120 is advanced.

The following Table 1 is an example of the result of controlling the cam phase generated by an operation of the front and rear one-way clutches 30-1 and 30-2 in a response to hydraulic control signals.

TABLE 1

| Oil Pressure | Clutch (30-1) | Clutch (30-2) | CVVT (1) |
|---|---|---|---|
| 1) grv_2 < grv_1 − Pb | CCW (retard) | CCW (retard) | CCW (retard) |
| 2) grv_1 − Pb < grv_2 < grv_1 + Pb | CCW (retard) | CW (advance) | Fixed (when engine is stopped or normally driven) |
| 3) grv_1 + Pb < grv_2 | CW (advance) | CW (advance) | CW (advance) |

In Table 1, CCW: counterclockwise, and CW: clockwise.

Figure 11:
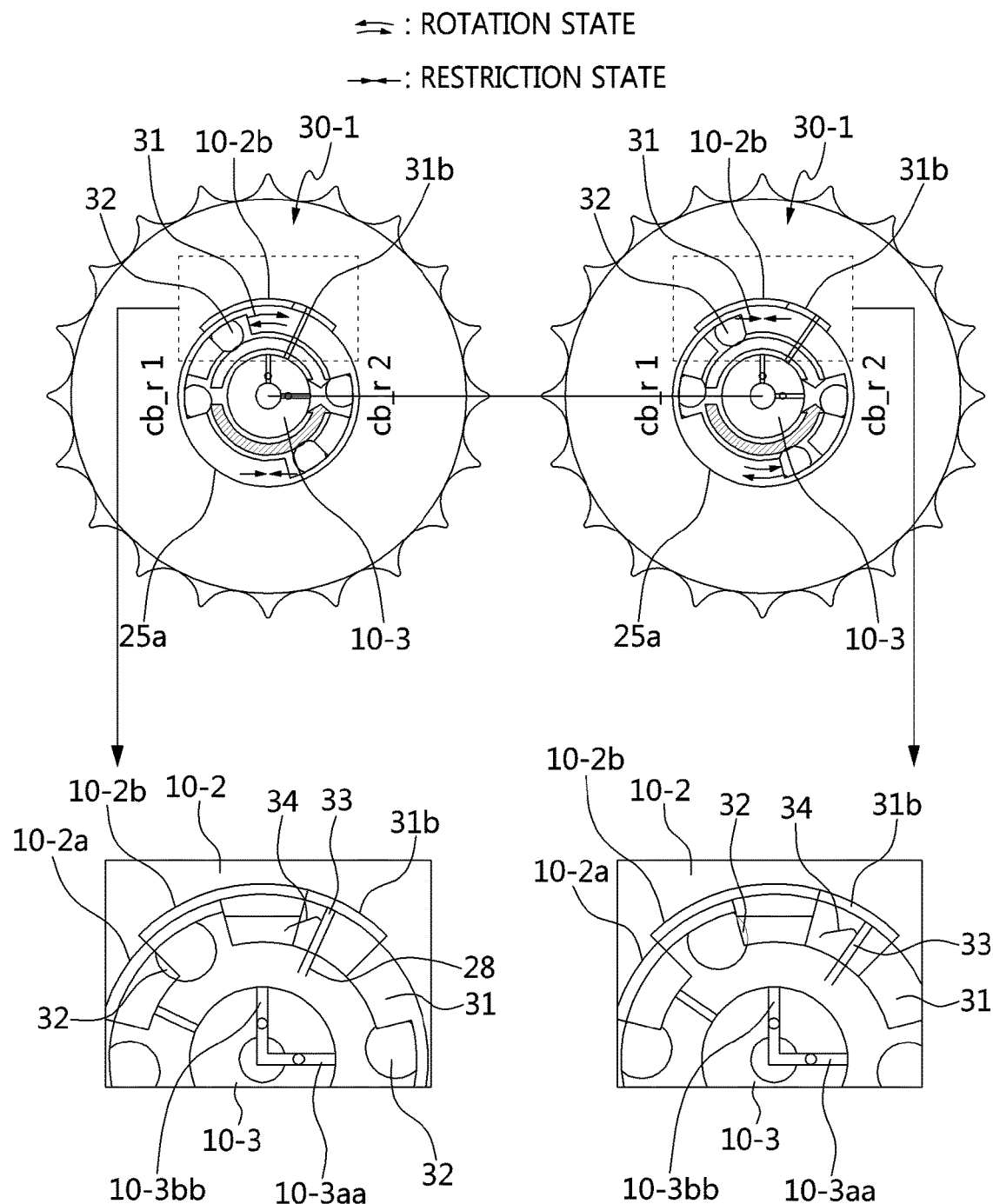
FIG. 11 is a view illustrating an operating state of the one-way clutch, which restricts rotation of a rotor after retarding or advancing the camshaft by position control of the carrier in a response to hydraulic signals, according to an exemplary embodiment of the present invention.

FIG. 11 illustrates an operation for restriction of rotation of the rotor 20 by the stopper groove 10-2b of the sprocket 10-2 and the stopper carrier 31b of the carrier 31, and is an example in which the hydraulic signal has the relationship of "cb_f1+Pb<cb_f2".

As illustrated in the drawing, in the relationship of "cb_f1+Pb<cb_f2", the counterclockwise rotation of the carrier 31 of each of the front and rear one-way clutches 30-1 and 30-2 is restricted, as illustrated in the left drawing of FIG. 1, generating clockwise rotation, and at the same time the cam 122 of the camshaft 120 is moved in the clockwise direction by counterclockwise fixing. In the present case, the stopper carrier 31b is located at one end portion of the stopper groove 10-2b, and the ball 32 is pressed against the left end portion of the ball slot 31a at a position relative to the carrier 31. In the present state, when the cam 122 is additionally rotated in the clockwise direction thereof, the position of the carrier 31 is changed by the stopper carrier. As such, the change in position of the carrier 31 generates counterclockwise rotation of the carrier 31, as illustrated in the right drawing of FIG. 11, and thus the cam 122 of the camshaft 120 is moved in the counterclockwise direction by clockwise fixing.

Accordingly, the stopper carrier 31b of the carrier 31 is restricted by the shape of the stopper groove 10-2b while moving along the stopper groove 10-2b of the sprocket 10-2. As a result, when the rotor 20 moves by a predetermined angle or more during advance/retard, the stopper carrier 31b moves to a position different from the determined position in a response to hydraulic signals so that the movement of the rotor 20 is additionally limited.

As described above, the variable valve timing device 1 applied to the engine system 100 according to the present exemplary embodiment includes the rotor 20, which is supplied with oil and is rotated in clockwise and counterclockwise directions, and the one-way clutches 30-1 and 30-2 which are coupled to the rotor 20 to limit an amount of rotation of the rotor. The one-way clutches 30-1 and 30-2 restrict the clockwise/counterclockwise rotation of the rotor 20 by the torque of the camshaft 120, achieving an improvement in fuel efficiency/emission material (EM) of the engine in addition to improving a phase setting degree of freedom and expanding a phase shift with respect to the camshaft 120 when the engine is started. It is possible to realize rapid response and intermediate phase starting and to increase a phase range with low cost.

The variable valve timing device according to an exemplary embodiment of the present invention has a relatively simple structure and utilizes the one-way clutch as an already-tested mechanical element. Therefore, it is possible to freely configure the phase of the variable valve timing device when the engine is started, to increase a phase shift, and to significantly contribute to an improvement in fuel efficiency/EM of the engine. It is possible to realize rapid response and intermediate phase starting and to increase a phase range with low cost.

Furthermore, since the opening or closing timings of the intake and exhaust valves are controlled by the variable valve timing device having the one-way clutch, it is possible to further achieve an improvement in fuel efficiency/EM of the engine.

For convenience in explanation and accurate definition in the appended claims, the terms "upper", "lower", "up", "down", "upwards", "downwards", "internal", "outer", "inside", "outside", "inwardly", "outwardly", "internal", "external", "front", "rear", "back", "forwards", and "backwards" are used to describe features of the exemplary embodiments with reference the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A variable valve timing device comprising:
  a rotor device including a rotor rotatable in clockwise or counterclockwise direction with a supply of oil thereto, and a one-way clutch coupled to the rotor to limit an amount of rotation of the rotor,
  wherein the one-way clutch includes a carrier surrounding an external peripheral surface of the rotor to form first and second chambers filled with the oil while a position of the carrier is controlled, a ball disposed in a ball slot of the carrier to come into contact with the external peripheral surface of the rotor, a stopper carrier protruding from the carrier to limit the amount of rotation of the rotor, and an elastic member supported by a vane fixed on the external peripheral surface of the rotor.

2. The variable valve timing device of claim 1, wherein the rotor has a rotor body having a shaft hole formed in a center thereof, the carrier surrounds an external diameter portion of the rotor body, the ball contacts with an external peripheral surface of the rotor body, and the vane is fixed on the external peripheral surface of the rotor body.

3. The variable valve timing device of claim 2, wherein the rotor body has a hexagonal shape, the hexagonal rotor body has upper and lower sealing surfaces formed to seal the center thereof and first and second clutch acting surfaces, the ball contacting with the first and second clutch acting surfaces, and a fixed slit is recessed on one of the upper and lower sealing surfaces, the vane being fixed into the fixed slit.

4. The variable valve timing device of claim 3, wherein the rotor body further has an oil outlet hole radially formed therein, wherein the oil is discharged from an internal diameter portion of the rotor body to an external diameter portion thereof.

5. The variable valve timing device of claim 2, wherein the rotor body has a rotor flange formed at an intermediate portion thereof, and the one-way clutch includes a front one-way clutch provided at a first side of the rotor flange and a rear one-way clutch provided at a second side of the rotor flange.

6. The variable valve timing device of claim 2, wherein the rotor body has first and second rotor flanges formed at a first end portion and a second end portion thereof, and the one-way clutch includes front and rear one-way clutches facing each other between the first and second rotor flanges.

7. The variable valve timing device of claim 1, wherein the rotor is coupled to a sprocket having a rotor hole surrounding an external diameter portion of the rotor, and a stopper groove is recessed on an internal peripheral surface of the rotor hole, the stopper carrier being coupled to the stopper groove.

8. The variable valve timing device of claim 1, wherein the rotor is coupled to a rotation shaft fitted into a shaft hole, the rotation shaft has an oil groove through which the oil is supplied to the carrier to control the position of the carrier, and the rotor and the rotation shaft are fixed by a shaft fixing member.

9. The variable valve timing device of claim 8, wherein front and rear covers are coupled to first and second predetermined sides of the rotor.

10. An engine system comprising:
a variable valve timing device including a rotor, an internal diameter portion of which is coupled with a camshaft for supply of oil while a sprocket is coupled to an external diameter portion of the rotor, and a pair of front and rear one-way clutches coupled to the rotor to form first and second chambers filled with the oil;
a hydraulic circuit configured to supply the oil to the camshaft; and
an electronic control unit (ECU) configured to control the hydraulic circuit for the supply of the oil,
wherein the rotor has a hexagonal rotor body, and the hexagonal rotor body has upper and lower sealing surfaces formed to seal a center thereof and first and second clutch acting surfaces acting on a respective front and rear one-way clutches.

11. The engine system of claim 10, wherein
the front one-way clutch includes a carrier surrounding a first portion of the rotor body to form first and second chambers filled with the oil while a position of the carrier controlled by pressure of the oil, a ball disposed in a ball slot of the carrier to contact with an external peripheral surface of the rotor body, a stopper carrier protruding from the carrier to limit an amount of rotation of the rotor body, and an elastic member supported by a vane fixed on the external peripheral surface of the rotor body; and the rear one-way clutch includes a carrier surrounding a second portion of the rotor body to form first and second chambers filled with the oil while the position of the carrier is controlled by the pressure of the oil, another ball located in a ball slot of the carrier to contact with an external peripheral surface of the rotor body, a stopper carrier protruding from the carrier to limit an amount of rotation of the rotor body, and an elastic member supported by a vane fixed on the external peripheral surface of the rotor body.

12. The engine system of claim 11, wherein the vanes are fixedly fitted into a fixed slit formed on one of the upper and lower sealing surfaces of the rotor body.

13. The engine system of claim 11, wherein the carrier has the stopper carrier protruding therefrom, and the stopper carrier is coupled to a stopper groove formed in an internal diameter portion of the sprocket.

14. The engine system of claim 10, wherein the rotor is fixed by a shaft fixing member fastened to the camshaft in a state in which front and rear covers are coupled to first and second predetermined sides of the rotor.

15. The engine system of claim 10, wherein the rotor includes the rotor body having an oil outlet hole radially formed therein for the discharge of oil, the front and rear one-way clutches being coupled to the rotor body, and a rotor flange forming a concentric circle at an intermediate portion of the rotor body to separate the front and rear one-way clutches from each other.

16. The engine system of claim 10, wherein the rotor includes a rotor body having an oil outlet hole radially formed therein for the discharge of oil, the front and rear one-way clutches being coupled to the rotor body, and rotor flanges forming a concentric circle at a first end portion and a second end portion of the rotor body to surround the front and rear one-way clutches.

17. The engine system of claim 10, wherein the camshaft has a cam for opening or closing intake and exhaust valves and advance and retard oil grooves formed for the supply of oil, the advance and retard oil grooves lead to the internal diameter portion of the rotor, and the sprocket is connected to a crankshaft by a chain.

18. The engine system of claim 10, wherein the hydraulic circuit includes an oil pump operated by control of the ECU to pump the oil, an oil line leading from the oil pump to the camshaft wherein the oil is supplied to the rotor through the camshaft, and an oil-flow control valve configured to open or close the oil line by control of the ECU to control supply of the oil.

* * * * *